(12) United States Patent
Hsiao et al.

(10) Patent No.: US 11,630,538 B2
(45) Date of Patent: Apr. 18, 2023

(54) ELECTRONIC DEVICE AND TOUCH METHOD THEREOF

(71) Applicant: ASUSTEK COMPUTER INC., Taipei (TW)

(72) Inventors: Wen Fang Hsiao, Taipei (TW); I-Hsi Wu, Taipei (TW); Tsung-Yi Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/516,199

(22) Filed: Nov. 1, 2021

(65) Prior Publication Data

US 2022/0137734 A1 May 5, 2022

(30) Foreign Application Priority Data

Nov. 5, 2020 (TW) .................................. 109138592

(51) Int. Cl.
*G06F 3/043* (2006.01)
*G06F 3/0488* (2022.01)
*G06F 3/041* (2006.01)

(52) U.S. Cl.
CPC ............ *G06F 3/043* (2013.01); *G06F 3/0412* (2013.01); *G06F 3/0418* (2013.01); *G06F 3/0488* (2013.01); *G06F 2203/04105* (2013.01)

(58) Field of Classification Search
None
See application file for complete search history.

(56) References Cited

U.S. PATENT DOCUMENTS

| 8,942,951 B2 | 1/2015 | Moussavi |
| 9,569,007 B2 | 2/2017 | Kim et al. |
| 2020/0064960 A1* | 2/2020 | Munemoto ......... G06F 3/04883 |

FOREIGN PATENT DOCUMENTS

| CN | 102262470 A | 11/2011 |
| CN | 102810030 A | 12/2012 |
| CN | 105302369 A | 2/2016 |
| CN | 105700750 A | 6/2016 |
| CN | 106598236 A | 4/2017 |
| CN | 106919283 A | 7/2017 |
| CN | 106293219 B | 9/2019 |

* cited by examiner

*Primary Examiner* — Aneeta Yodichkas
(74) *Attorney, Agent, or Firm* — Muncy, Geissler, Olds & Lowe, P.C.

(57) ABSTRACT

An electronic device is provided. The electronic device includes an ultrasonic input module and a control unit. The control unit is electrically connected to the ultrasonic input module. The control unit is configured to: continuously read a setting signal of the ultrasonic input module within a preset time to generate a threshold, where the setting signal includes a plurality of sensing values; receive an input signal by using the ultrasonic input module, where the input signal includes a feature value; and compare the feature value with the threshold to generate associated information, and process the input signal according to the associated information. The disclosure further provides a touch method applied to the electronic device.

6 Claims, 10 Drawing Sheets

FIG. 6C

ELECTRONIC DEVICE AND TOUCH METHOD THEREOF

CROSS-REFERENCE TO RELATED APPLICATION

This application claims the priority benefit of Taiwan Application Serial No. 109138592, filed on Nov. 5, 2020. The entirety of the above-mentioned patent application is hereby incorporated by reference herein and made a part of specification.

BACKGROUND OF THE INVENTION

Field of the Invention

The disclosure relates to an electronic device and it's touch method.

Description of the Related Art

An ultrasonic sensor is an apparatus that emits ultrasonic waves to an object by a sound emitter and receives reflected waves by a sound receiver to determine whether the object exists or not and a moving state of the object as well. With the development of technologies, the industry has thought about replacing physical keys on a mobile device with an ultrasonic sensor.

The ultrasonic sensor does not use physical keys for input. In practice, a touch position generated by the ultrasonic sensor is easily inconsistent with a user perception operation, causing problems such as a mistaken touch and picture shaking that do not conform to a user operation.

BRIEF SUMMARY OF THE INVENTION

The disclosure provides a touch method applied to an ultrasonic input module. The touch method includes: continuously reading a setting signal of the ultrasonic input module within a preset time to generate a threshold, where the setting signal includes a plurality of sensing values; receiving an input signal by using the ultrasonic input module, where the input signal includes a feature value; and comparing the feature value with the threshold to generate associated information, and processing the input signal according to the associated information.

The disclosure further provides an electronic device. The electronic device includes an ultrasonic input module and a control unit. The control unit is electrically connected to the ultrasonic input module. The control unit is configured to: continuously read a setting signal within a preset time by using the ultrasonic input module, to generate a threshold, where the setting signal includes a plurality of sensing values; receive an input signal by using the ultrasonic input module, where the input signal includes a feature value; and compare the feature value with the threshold to generate associated information, and process the input signal according to the associated information.

In the electronic device and the touch method provided in the disclosure, various operating modes are respectively adjusted according to use habits of a user, so that an actual sensing result of the ultrasonic input module conforms to a perception operation of the user, thereby improving user experiences.

DETAILED DESCRIPTION OF THE EMBODIMENTS

More detailed descriptions of specific embodiments of the disclosure are provided below with reference to the schematic diagrams. The features and advantages of the disclosure are described more clearly according to the following description and claims. It is to be noted that all of the drawings use very simplified forms and imprecise proportions, only being used for assisting in conveniently and clearly explaining the objective of the embodiments of the disclosure.

Figure 1:
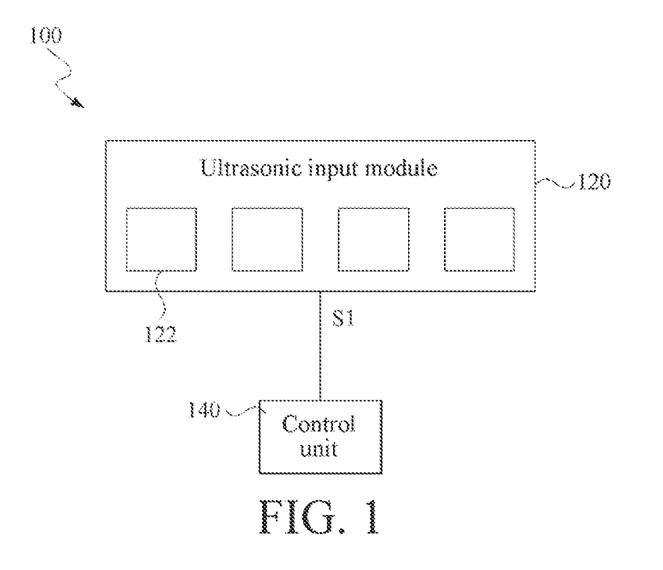
FIG. 1 is a schematic block diagram of an embodiment of an electronic device according to the disclosure.
Figure 2:
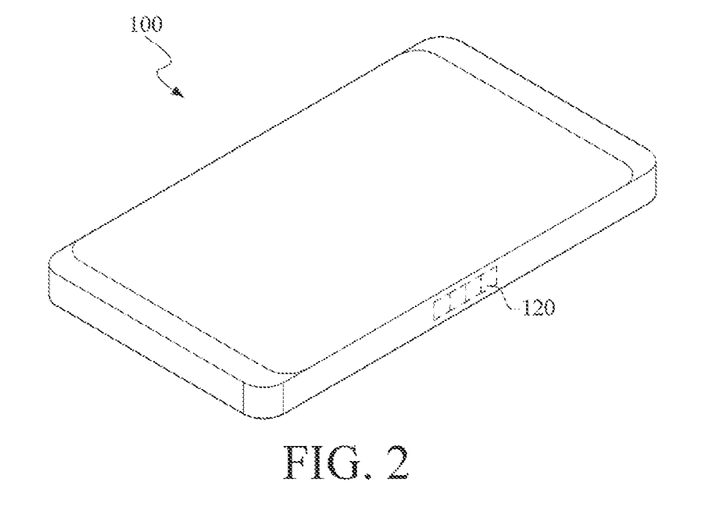
FIG. 2 is a schematic three-dimensional diagram of an embodiment of an electronic device according to the disclosure.

FIG. 1 is a schematic block diagram of an embodiment of an electronic device according to the disclosure. FIG. 2 is a schematic three-dimensional diagram of an embodiment of an electronic device according to the disclosure.

Referring to FIG. 1, the electronic device 100 includes an ultrasonic input module 120 and a control unit 140. The control unit 140 is electrically connected to the ultrasonic input module 120. In an embodiment, the ultrasonic input module 120 includes a plurality of ultrasonic sensing units 122. The ultrasonic sensing units 122 are arranged in a two-dimensional array or a one-dimensional line. The ultrasonic sensing units 122 detect whether an input provider (such as a finger or skin) exists, and generate detection signals S1.

With reference to the detection signals S1 from the plurality of ultrasonic sensing units 122, center-of-gravity position information of a touch of the input provider including a magnitude of touch pressure, a moving distance, a moving direction, and the like, are accessed through calculation such that common touch operation gestures such as sliding, taping, and pressing and holding of a user can be interpreted accordingly.

In an embodiment, the electronic device 100 is a mobile device such as a smartphone or an electronic bracelet. Referring to FIG. 2, using a smartphone as an example, the ultrasonic input module 120 is disposed at a position other than a display panel of the smartphone, such as a side or a back cover of the smartphone. In the figure, the ultrasonic input module 120 is disposed on a side of the smartphone.

In an embodiment, as shown in FIG. 2, the plurality of ultrasonic sensing units 122 is adjacently arranged on the side of the smartphone to replace conventional volume adjustment buttons. However, the disclosure is not limited thereto. In an embodiment, the plurality of ultrasonic sensing units 122 is arranged on the back cover of the smartphone as another touch input device other than a touch panel.

Figure 3:
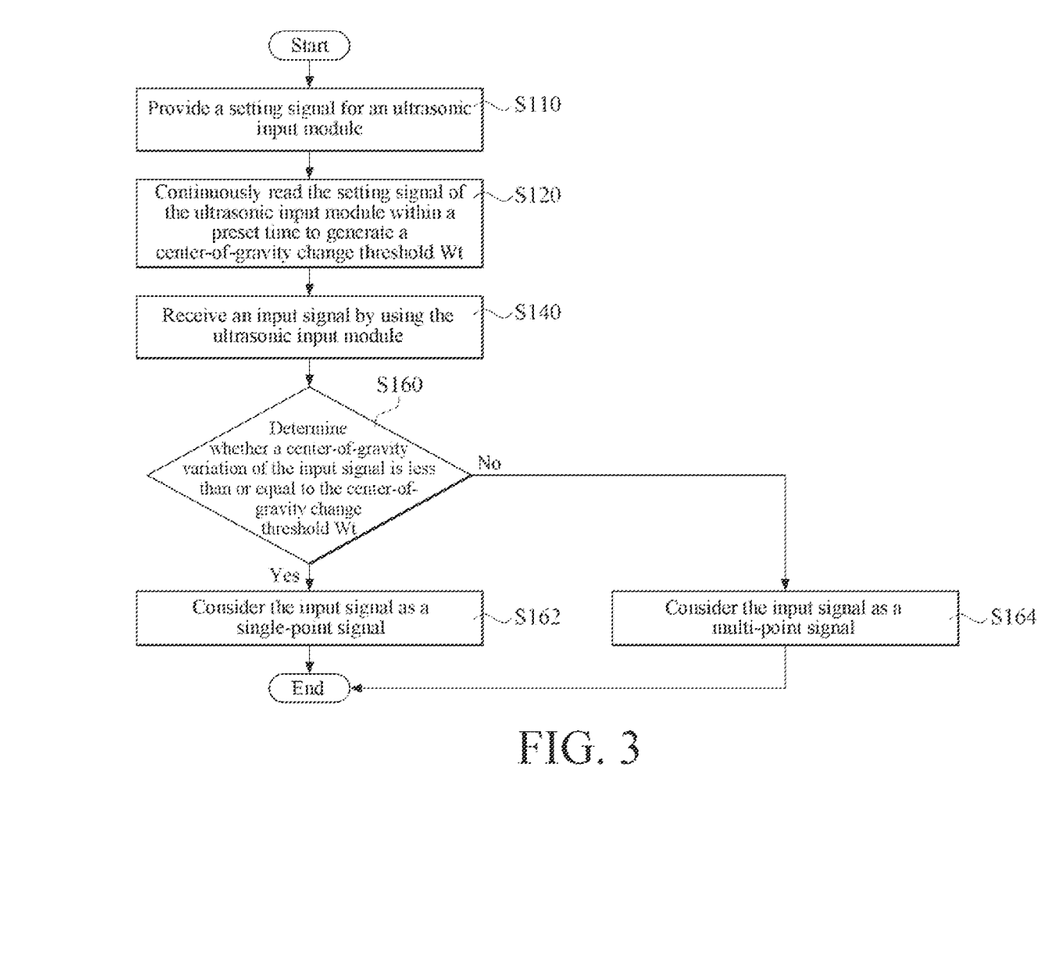
FIG. 3 is a schematic flowchart of an embodiment of a touch method according to the disclosure.
Figure 4A:
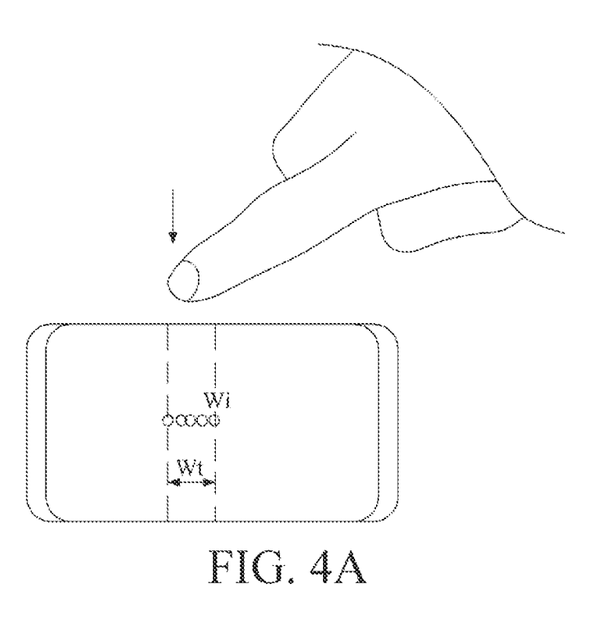
FIG. 4A to FIG. 4C show steps corresponding to FIG. 3 based on a smartphone.
Figure 4B:
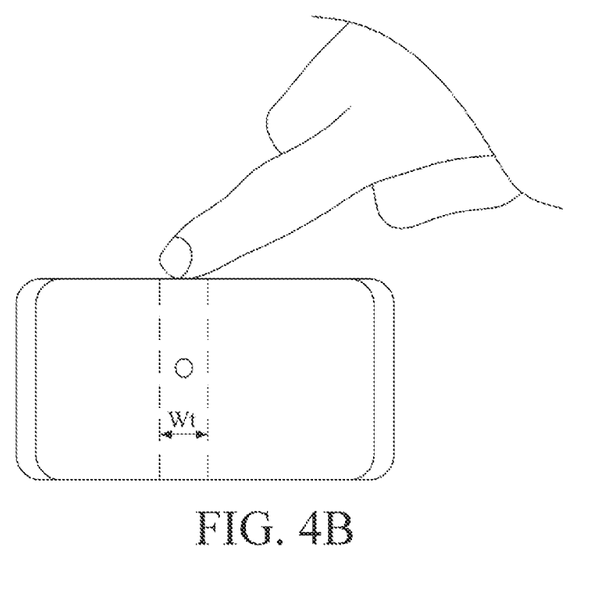
Figure 4C:
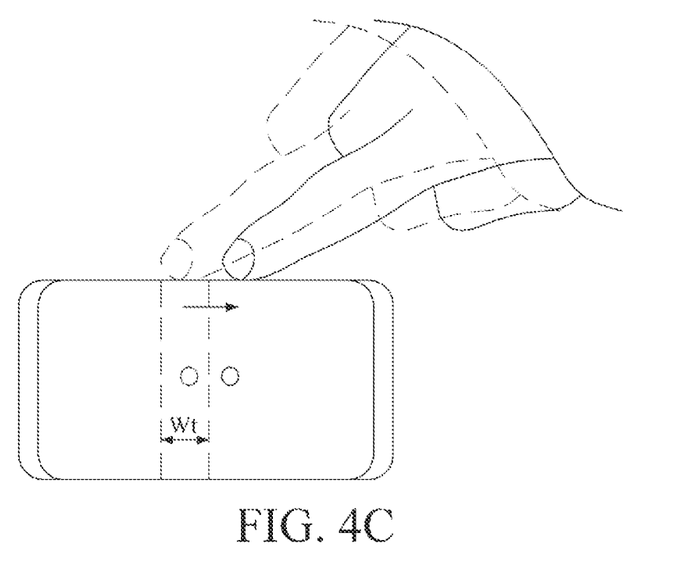

FIG. 3 is a schematic flowchart of an embodiment of a touch method according to the disclosure. FIG. 4A to FIG. 4C show steps corresponding to FIG. 3 based on a smartphone.

Referring to FIG. 3, a touch method applied to the electronic device 100 shown in FIG. 1 or FIG. 2 is provided in the disclosure. The method is applied to the ultrasonic input module 120. The touch method includes the following steps.

Please refer to FIG. 4A, in step S110, a setting signal is provided for the ultrasonic input module 120. Next, in step S120, the setting signal of the ultrasonic input module 120 is continuously read within a preset time to generate a center-of-gravity change threshold Wt. The setting signal includes a plurality of pieces of center-of-gravity position information Wi. Circles in FIG. 4A respectively represent a plurality of pieces of center-of-gravity position information Wi detected by the ultrasonic input module 120. The setting signal is a touch signal from a user.

In an embodiment, the center-of-gravity change threshold Wt is a maximum variation of the center-of-gravity position information. In an embodiment, the preset time is greater than or equal to 3 seconds, to effectively reflect operation behavior and preference of the user. This step is performed by the control unit 140 in FIG. 1.

Steps S110 and S120 are setting steps, in which the center-of-gravity change threshold Wt is generated and recorded in the electronic device 100 to reflect a perception operation of the user. In an embodiment, when the user inputs the setting signal, the user perceives the setting signal as a static single-point touch input signal rather than a slide signal. The center-of-gravity change threshold Wt reflects an operation habit of the user as a criterion of determining a single-point touch and a multi-point touch.

After the setting steps (that is, steps S110 and S120) are performed, step S140 is further performed: an input signal is received by using the ultrasonic input module 120. The input signal includes a feature value. In this embodiment, the feature value is a center-of-gravity variation. The signal is a touch signal generated by an actual operation of the user. This step is performed by the control unit 140 in FIG. 1.

Next, in step S160, it is determined that whether the center-of-gravity variation of the input signal is less than or equal to the center-of-gravity change threshold Wt. That is, the center-of-gravity variation of the input signal is compared with the center-of-gravity change threshold Wt to generate associated information. This step is performed by the control unit 140 in FIG. 1.

Next, referring to FIG. 4B and FIG. 3, as shown in step S162, when the center-of-gravity variation is less than or equal to the center-of-gravity change threshold Wt, the input signal is considered as a single-point signal. On the contrary, referring to FIG. 4C and FIG. 3, as shown in step S164, when the center-of-gravity variation is greater than the center-of-gravity change threshold Wt, the input signal is considered as a multi-point signal (circles in FIG. 4C each represent a piece of center-of-gravity position information).

Steps S162 and S164 are performed by the control unit 140 in FIG. 1. After the determining step, the control unit 140 then generates a corresponding touch signal according to the associated information between the center-of-gravity variation and the center-of-gravity change threshold Wt to control the electronic device 100 to process.

In the foregoing embodiment, when the center-of-gravity variation is less than or equal to the center-of-gravity change threshold Wt, the signal is considered as a single-point signal, and when the center-of-gravity variation is greater than the center-of-gravity change threshold Wt, the input signal is considered as a multi-point signal. However, the disclosure is not limited thereto.

In another embodiment, when the center-of-gravity variation is less than the center-of-gravity change threshold Wt, the input signal is considered as a single-point signal, and when the center-of-gravity variation is equal to or greater than the center-of-gravity change threshold Wt, the input signal is considered as a multi-point signal.

In the foregoing touch manner, a phenomenon that a single-point input signal inputted by the user is read as a multi-point signal, and thus a picture or a cursor shakes is avoided, thereby improves operation experience of the user.

Figure 5:
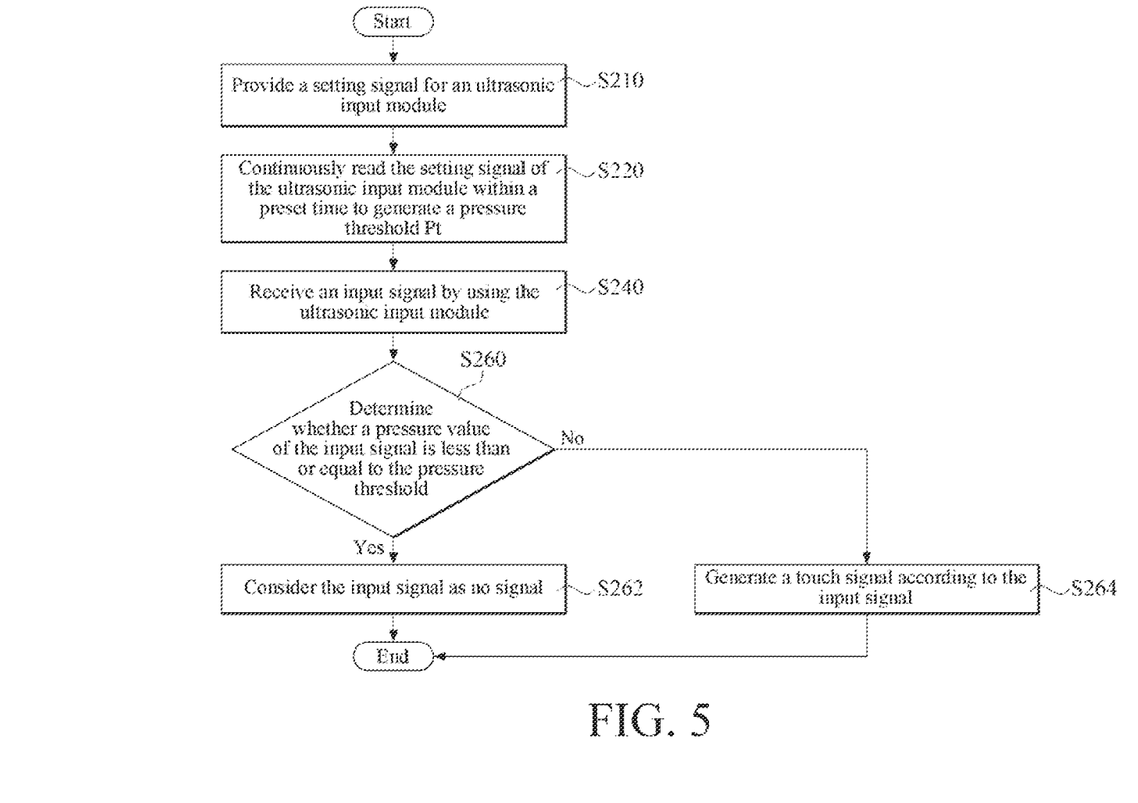
FIG. 5 is a schematic flowchart of another embodiment of a touch method according to the disclosure.
Figure 6A:
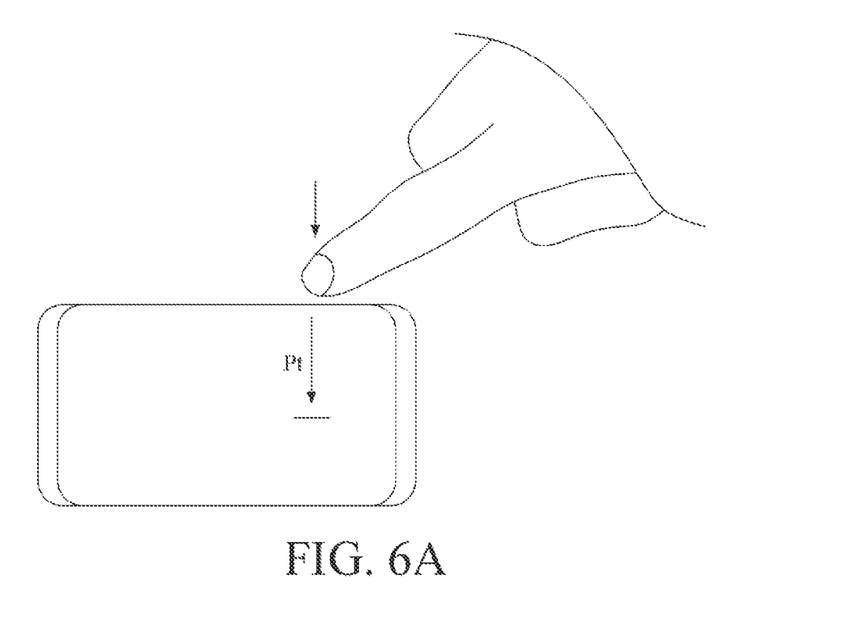
FIG. 6A to FIG. 6C show steps corresponding to FIG. 5 based on a smartphone.
Figure 6B:
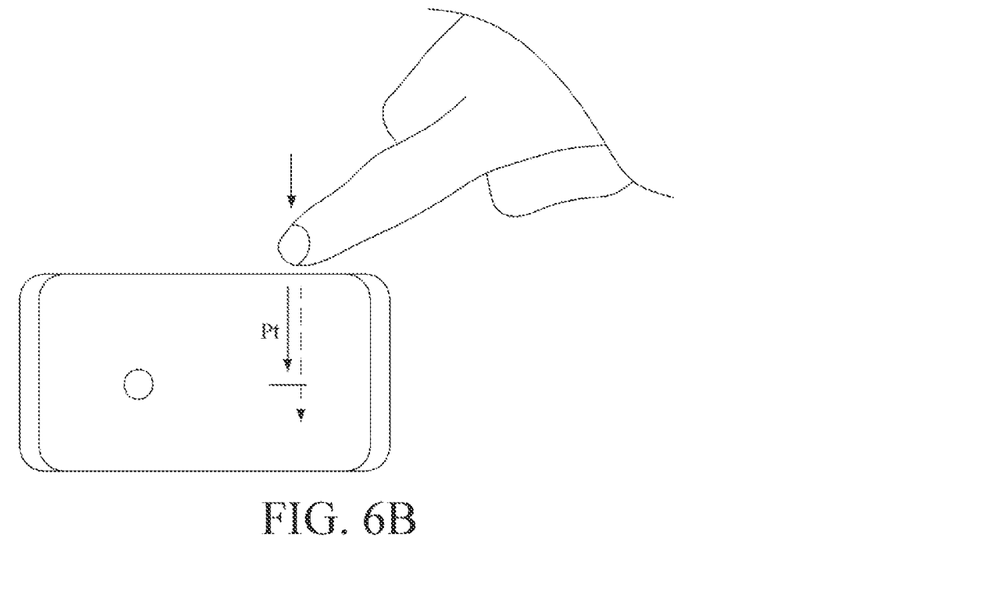
Figure 6C:
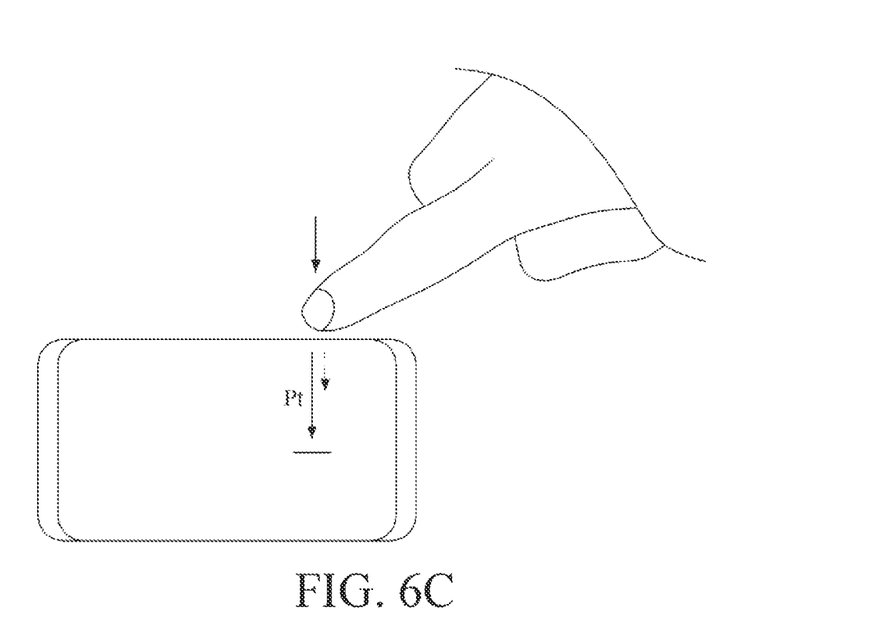

FIG. 5 is a schematic flowchart of another embodiment of a touch method according to the disclosure. FIG. 6A to FIG. 6C show steps corresponding to FIG. 5 based on a smartphone.

Referring to FIG. 5, another touch method applied to the electronic device 100 shown in FIG. 1 is provided in the disclosure. The method is applied to the ultrasonic input module 120. The touch method includes the following steps.

First, referring to FIG. 6A, in step S210, a setting signal is provided for the ultrasonic input module 120. Next, in step S220, the setting signal of the ultrasonic input module 120 is continuously read within a preset time to generate a pressure threshold Pt. The setting signal includes a plurality of sensed pressure values. The setting signal is a touch signal from a user. In an embodiment, the pressure threshold Pt is a median of the sensed pressure values. However, the foregoing embodiment is not limited thereto.

In an embodiment, the pressure threshold Pt is an average value of the sensed pressure values. In an embodiment, the preset time is greater than or equal to 3 seconds, to effectively reflect a perception operation of the user. This step is performed by the control unit 140 in FIG. 1.

Steps S210 and S220 are setting steps, in which a pressure threshold Pt corresponding to a specific user is generated and recorded in the electronic device 100, to reflect a perception operation of the user. In an embodiment, when the user inputs the setting signal, the user perceives the setting signal as a valid single-point touch input signal. The pressure threshold Pt reflects an operation habit of the user, which is used as a criterion of determining whether an operation is a mistaken touch.

After the setting steps are performed, in step S240, an input signal is received by using the ultrasonic input module 120. The input signal includes a feature value. In this embodiment, the feature value is a pressure value. The input signal is a touch signal generated by an actual operation of the user. This step is performed by the control unit 140 in FIG. 1.

Next, in step S260, it is determined that whether the pressure value of the input signal is less than or equal to the pressure threshold Pt. That is, the pressure value of the input signal is compared with the pressure threshold Pt to generate associated information. This step is performed by the control unit 140 in FIG. 1.

Next, referring to FIG. 6B, as shown in step S262, when the pressure value is less than or equal to the pressure threshold Pt, the input signal is considered as no signal. An arrow length in the figure represents a magnitude of the pressure value. Next, referring to FIG. 6C, as shown in step S264, when the pressure value is greater than the pressure threshold Pt, a touch signal such as a single-point touch signal is generated according to the input signal. Steps S262 and S264 are performed by the control unit 140 in FIG. 1. After the determining, the control unit 140 then generates a corresponding touch signal according to the associated information between the pressure value and the pressure threshold Pt to control the electronic device 100 to process.

In the foregoing embodiment, when the pressure value is less than or equal to the pressure threshold Pt, the input signal is considered as no signal, and when the pressure value is greater than the pressure threshold Pt, a touch signal is generated according to a type of the input signal. However, the disclosure is not limited thereto. In another embodiment, when the pressure value is less than the pressure threshold Pt, the input signal is considered as no signal, and when the pressure value is equal to or greater than the pressure threshold Pt, a touch signal is generated according to the type of the input signal.

In the foregoing touch manner, a phenomenon that an unaware slight touch of the user is determined by the electronic device as a touch input signal and thus a mistaken touch occurs is avoided, thereby helping improve operation experience of the user.

Based on the above, in the touch method provided in the disclosure, a setting signal of an ultrasonic input module 120 is continuously read within a preset time. The setting signal includes a plurality of sensing values (such as the center-of-gravity position information, the pressure values, or other feature values of the setting signal) to generate a threshold (such as the center-of-gravity change threshold Wt or the pressure threshold Pt) to perform touch setting.

After the touch setting steps are performed, in the touch method provided in the disclosure, a feature value of an input signal (such as the center-of-gravity position information, the pressure values, or other feature values of the input signal) is compared with the threshold to generate associated information, and the input signal is processed according to the associated information, to ensure that an actual sensing result of the ultrasonic input module conforms to a perception operation of a user.

In the touch method and the electronic device 100 provided in the disclosure, various operating modes are respectively adjusted according to user's habits, so that an actual sensing result of the ultrasonic input module 120 conforms to a perception operation of the user, thereby improving user experience.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A touch method, applied to an ultrasonic input module, the touch method comprising:
continuously reading a setting signal of the ultrasonic input module within a preset time to generate a threshold, wherein the setting signal comprises a plurality of sensing values;
receiving an input signal by using the ultrasonic input module, wherein the input signal comprises a feature value; and
comparing the feature value with the threshold to generate associated information, and processing the input signal according to the associated information;
wherein the sensing values are center-of-gravity position information, the threshold is a center-of-gravity position change threshold, and the feature value is a center-of-gravity position variation of the input signal;
wherein the setting signal includes a plurality of pieces of center-of-gravity position information.

2. The touch method according to claim 1, wherein the center-of-gravity position change threshold is a maximum variation of the center-of-gravity position information.

3. The touch method according to claim 2, wherein when the associated information indicates that the center-of-gravity variation is less than the center-of-gravity position change threshold, the input signal is considered as a single-point signal, and when the associated information indicates that the center-of-gravity variation is greater than the center-of-gravity position change threshold, the input signal is considered as a multi-point signal.

4. The touch method according to claim 1, wherein the preset time is greater than or equal to 3 seconds.

5. An electronic device, comprising:
an ultrasonic input module; and
a control unit, electrically connected to the ultrasonic input module and configured to:
continuously read a setting signal within a preset time by using the ultrasonic input module to generate a threshold, wherein the setting signal comprises a plurality of sensing values;
receive an input signal by using the ultrasonic input module, wherein the input signal comprises a feature value; and
compare the feature value with the threshold to generate associated information, and process the input signal according to the associated information;
wherein the sensing values are center-of-gravity position information, the threshold is a center-of-gravity position change threshold, and the feature value is a center-of-gravity position variation of the input signal;
wherein the setting signal includes a plurality of pieces of center-of-gravity position information.

6. The electronic device according to claim 5, wherein the electronic device is a handheld electronic device, and the ultrasonic input module is disposed on a side of the electronic device.

* * * * *